(12) United States Patent
Burkey (10) Patent No.: US 7,971,013 B2
(45) Date of Patent: Jun. 28, 2011

(54) COMPENSATING FOR WRITE SPEED DIFFERENCES BETWEEN MIRRORING STORAGE DEVICES BY STRIPING

(75) Inventor: Todd R. Burkey, Savage, MN (US)

(73) Assignee: Xiotech Corporation, Eden Prairie, MN (US)

( * ) Notice: Subject to any disclaimer, the term of this patent is extended or adjusted under 35 U.S.C. 154(b) by 552 days.

(21) Appl. No.: 12/150,653

(22) Filed: Apr. 30, 2008

(65) Prior Publication Data

US 2009/0276567 A1 Nov. 5, 2009

(51) Int. Cl.
G06F 12/00 (2006.01)

(52) U.S. Cl. ............ 711/162; 711/114; 711/E12.001

(58) Field of Classification Search .......... 711/162, 711/114, 112, 170, E12.001, E12.002
See application file for complete search history.

(56) References Cited

U.S. PATENT DOCUMENTS

| | | | |
|---|---|---|---|
| 5,276,877 A | 1/1994 | Friedrich et al. |
| 5,392,244 A | 2/1995 | Jacobson et al. |
| 5,479,653 A | 12/1995 | Jones |
| 5,742,792 A | 4/1998 | Yanai et al. |
| 5,819,310 A | 10/1998 | Vishlitzky et al. |
| 5,870,537 A | 2/1999 | Kern et al. |
| 5,875,456 A | 2/1999 | Stallmo et al. |
| 5,897,661 A | 4/1999 | Baranovsky |
| 5,961,652 A | 10/1999 | Thompson |
| 6,035,306 A | 3/2000 | Lowenthal et al. |
| 6,237,063 B1 | 5/2001 | Bachmat et al. |
| 6,275,898 B1 | 8/2001 | DeKoning |
| 6,282,619 B1 | 8/2001 | Islam et al. |
| 6,401,215 B1 | 6/2002 | Maddalozzo et al. |
| 6,487,562 B1 | 11/2002 | Mason, Jr. et al. |
| 6,510,491 B1 | 1/2003 | Franklin et al. |
| 6,516,425 B1 | 2/2003 | Belhadj et al. |
| 6,530,035 B1 | 3/2003 | Bridge |
| 6,546,457 B1 | 4/2003 | Don et al. |
| 6,571,314 B1 | 5/2003 | Komachiya et al. |
| 6,578,158 B1 | 6/2003 | Deitz et al. |
| 6,629,202 B1 | 9/2003 | Cabrera et al. |
| 6,711,649 B1 | 3/2004 | Bachmat et al. |
| 6,715,054 B2 | 3/2004 | Yamamoto |
| 6,728,905 B1 | 4/2004 | Gnanasivam et al. |
| 6,745,207 B2 | 6/2004 | Reuter et al. |
| 6,766,416 B2 | 7/2004 | Bachmat |
| 6,810,491 B1 | 10/2004 | Yamamoto et al. |

(Continued)

OTHER PUBLICATIONS

Tanenbaum, Andrew S., "Structured Computer Organization," 1984, Prentice-Hall, Inc., 2nd Edition, pp. 10-12.

(Continued)

Primary Examiner — Pierre-Michel Bataille
(74) Attorney, Agent, or Firm — Beck & Tysver, P.L.L.C.

(57) ABSTRACT

A method and system for data storage provides a digital fast-write storage device, a plurality of digital slow-write storage devices, and a controller. The digital fast-write storage device might be a solid state drive. The digital slow-write storage devices might be conventional rotational media drives. Typically, read operations are directed to the fast-write storage device. The slow-write storage devices provide redundancy by mirroring the contents of the high-speed storage device. Data on the slow-write storage devices is organized in stripes, allowing data to be written in parallel. The number of slow-write storage devices can be chosen to compensate for the speed differential on write operations. In some embodiments, the controller will represent the storage system as a virtual disk drive.

26 Claims, 6 Drawing Sheets

U.S. PATENT DOCUMENTS

| | | | |
|---|---|---|---|
| 6,880,052 B2 | 4/2005 | Lubbers et al. | |
| 6,895,485 B1 | 5/2005 | DeKoning et al. | |
| 6,993,635 B1 | 1/2006 | Gazit et al. | |
| 7,062,624 B2 | 6/2006 | Kano | |
| 7,080,196 B1 | 7/2006 | Kitamura | |
| 7,185,144 B2 | 2/2007 | Corbett et al. | |
| 7,383,381 B1 * | 6/2008 | Faulkner et al. | 711/114 |
| 7,562,251 B1 * | 7/2009 | Karr | 714/6 |
| 2002/0133539 A1 | 9/2002 | Monday | |
| 2003/0023811 A1 | 1/2003 | Kim et al. | |
| 2003/0061491 A1 | 3/2003 | Jaskiewicz et al. | |
| 2003/0115218 A1 | 6/2003 | Bobbitt et al. | |
| 2003/0204700 A1 | 10/2003 | Biessener et al. | |
| 2003/0204773 A1 | 10/2003 | Petersen et al. | |
| 2004/0037120 A1 | 2/2004 | Uysal et al. | |
| 2006/0069862 A1 | 3/2006 | Kano | |

OTHER PUBLICATIONS

"Disk Thrashing" Jul. 3, 2003. Retrieved from http://www.webopedia.com/TERM/d/disk_thrashing.htm.
http://en.wikipedia.org/wiki/Storage_Area_Network.
Office Action, dated May 5, 2004, U.S. Appl. No. 10/183,979.
Office Action, dated Feb. 10, 2005, U.S. Appl. No. 10/183,946.
Office Action, dated Feb. 24, 2005, U.S. Appl. No. 10/390,022.
Office Action, dated Jun. 27, 2005, U.S. Appl. No. 10/184,059.
Office Action, dated Jul. 1, 2005, U.S. Appl. No. 10/184,058.
Office Action, dated Sep. 8, 2005, U.S. Appl. No. 10/183,949.
Office Action, dated Sep. 12, 2005, U.S. Appl. No. 10/445,811.
Office Action, dated Sep. 14, 2005, U.S. Appl. No. 10/390,022.
Office Action, dated Oct. 20, 2005, U.S. Appl. No. 10/629,415.
Office Action, dated Dec. 29, 2005, U.S. Appl. No. 10/184,058.
Office Action, dated Apr. 10, 2006, U.S. Appl. No. 10/445,811.
Office Action, dated May 1, 2006, U.S. Appl. No. 10/390,022.
Office Action, dated Jun. 1, 2006, U.S. Appl. No. 10/629,415.
Office Action, dated Aug. 22, 2006, U.S. Appl. No. 10/781,594.
Office Action, dated Jan. 5, 2007, U.S. Appl. No. 10/865,339.
Office Action, dated Feb. 6, 2007, U.S. Appl. No. 11/037,404.
Office Action, dated Feb. 8, 2007, U.S. Appl. No. 11/037,317.
Office Action, dated Feb. 15, 2007, U.S. Appl. No. 10/629,415.
Office Action, dated Feb. 27, 2007, U.S. Appl. No. 11/055,756.
Office Action, dated Jun. 19, 2007, U.S. Appl. No. 11/086,079.
Office Action, dated Jul. 27, 2007, U.S. Appl. No. 10/390,022.
Office Action, dated Sep. 10, 2007, U.S. Appl. No. 10/629,415.
Office Action, dated Sep. 18, 2007, U.S. Appl. No. 11/241,176.
Office Action, dated Sep. 20, 2007, U.S. Appl. No. 11/037,317.
Office Action, dated Sep. 20, 2007, U.S. Appl. No. 10/390,022.
Office Action, dated Oct. 19, 2007, U.S. Appl. No. 11/055,756.
Office Action, dated Feb. 11, 2008, U.S. Appl. No. 11/037,404.
Office Action, dated Mar. 18, 2008, U.S. Appl. No. 11/037,317.
Office Action, dated Apr. 4, 2008, U.S. Appl. No. 11/086,079.
Office Action, dated Jun. 16, 2008, U.S. Appl. No. 11/229,964.
Office Action, dated Aug. 18, 2008, U.S. Appl. No. 11/037,317.
Office Action, dated Dec. 9, 2008, U.S. Appl. No. 11/037,404.
Office Action, dated Dec. 10, 2008, U.S. Appl. No. 10/629,415.
Office Action, dated Dec. 12, 2008, U.S. Appl. No. 11/037,317.
Office Action, dated Feb. 3, 2009, U.S. Appl. No. 11/086,079.
Office Action, dated Mar. 4, 2009, U.S. Appl. No. 11/055,756.
Office Action, dated Jun. 22, 2009, U.S. Appl. No. 11/055,756.
Office Action, dated Aug. 4, 2009, U.S. Appl. No. 10/629,415.

* cited by examiner

COMPENSATING FOR WRITE SPEED DIFFERENCES BETWEEN MIRRORING STORAGE DEVICES BY STRIPING

FIELD OF THE INVENTION

The present invention relates to the field of data storage, and, more particularly, to mirroring data between storage devices having different write speeds

BACKGROUND OF THE INVENTION

Storage virtualization inserts a logical abstraction layer or facade between one or more computer systems and one or more physical storage devices. With storage virtualization, a computer can address storage through a virtual disk (VDisk), which responds to the computer as if it were a physical disk (PDisk). A VDisk may be configured using a plurality of physical storage devices and techniques to provide redundancy and improve performance.

Virtualization is often performed within a storage area network (SAN), allowing a pool of storage devices with a storage system to be shared by a number of host computers. Hosts are computers running application software, such as software that performs input or output (IO) operations using a database. Connectivity of devices within many modern SANs is implemented using Fibre Channel technology. Ideally, virtualization is implemented in a way that minimizes manual configuration of the relationship between the logical representation of the storage as one or more VDisks, and the implementation of the storage using physical devices. Tasks such as backing up, adding a new physical storage device, and handling failover in the case of an error condition should be handled as automatically as possible.

In effect, a VDisk is a facade that allows a set of PDisks, or more generally a set of portions of PDisks, to imitate a single PDisk. Virtualization techniques for configuring the PDisks behind the VDisk facade can improve performance and reliability compared to the more traditional approach of a disk drive directly connected to a single computer system. Standard virtualization techniques include mirroring, striping, concatenation, and writing parity information.

Mirroring involves maintaining two or more separate copies of data. Strictly speaking, mirroring involves maintaining copies of the contents of an extent, either a real extent or a virtual extent. An extent is a set of consecutively addressed units of storage (e.g., bytes or words). The copies are maintained on an ongoing basis over a period of time. During that time, the data within the mirrored extent might change, but the mirroring relationship will be maintained such that the copies change correspondingly. When we say herein that data is being mirrored, it should be understood to mean that an extent containing data is being mirrored.

Typically, the copies are located on distinct disks that, for purposes of security or disaster recover, are sometimes remote from each other, in different areas of a building, different buildings, or different cities. Mirroring provides redundancy. If a device containing one copy, or a portion of a copy, suffers a failure of functionality (e.g., a mechanical or electrical problem), then that device can be serviced or removed while one or more of the other copies is used to provide storage and access to existing data. Mirroring can also be used to improve read performance. Given copies of data on drives A and B, then a read request can be satisfied by reading, in parallel, a portion of the data from A and a different portion of the data from B. Alternatively, a read request can be sent to both A and B. The request is satisfied from either A or B, whichever returns the required data first. If A returns the data first then the request to B can either be cancelled, or the request to B can be allowed to proceed, but the results will be ignored. Mirroring can be performed synchronously or asynchronously.

Striping involves splitting data into smaller pieces, called "stripes." Logically sequential data stripes are written to separate storage devices, in a round-robin fashion. For example, suppose a file or dataset were regarded as consisting of 6 contiguous parts of equal size, numbered 1 to 6. Striping these across 3 drives would typically be implemented with parts 1 and 4 as stripes on the first drive; parts 2 and 5 as stripes on the second drive; and parts 3 and 6 as stripes on the third drive. Striping improves performance on conventional hard disks because data does not need to be written sequentially by a single drive, but instead can be written in parallel by several drives. In the example just described, stripes 1, 2, and 3 could be written in parallel. Striping can reduce reliability, however, because failure of any one of the devices holding stripes will render the data in that entire copy unrecoverable. To avoid this, striping and mirroring are often combined.

Writing of parity information is an alternative to mirroring for recovery of data upon failure. In parity redundancy, redundant data is typically calculated from several areas (e.g., 2, 4, or 8 different areas) of the storage system and then stored in one area of the storage system. The size of the redundant storage area is less than the remaining storage area used to store the original data.

A Redundant Array of Independent (or Inexpensive) Disks (RAID) describes several levels of storage architectures that employ the above techniques. For example, a RAID 0 architecture is a striped disk array that is configured without any redundancy. Since RAID 0 is not a redundant architecture, it is often omitted from a discussion of RAID systems. A RAID 1 architecture involves storage disks configured according to mirror redundancy. Original data is stored on one set of disks and duplicate copies of the data are maintained on separate disks. Conventionally, a RAID 1 configuration has an extent that fills all the disks involved in the mirroring. In practice, mirroring sometimes only utilizes a fraction of a disk, such as a single partition, with the remainder being used for other purposes. The RAID 2 through RAID 5 architectures each involve parity-type redundant storage. RAID 10 is simply a combination of RAID 0 (striping) and RAID 1 (mirroring). This RAID type allows a single array to be striped over two or more PDisks with the stripes also mirrored over two or more PDisks.

Concatenation involves combining two or more disks, or disk partitions, so that the combination behaves as if it were a single disk. Not explicitly part of the RAID levels, concatenation is a virtualization technique to increase storage capacity behind the VDisk facade.

Virtualization can be implemented in any of three storage system levels—in the hosts, in the storage devices, or in a network device operating as an intermediary between hosts and storage devices. Each of these approaches has pros and cons that are well known to practitioners of the art.

Various types of storage devices are used in current data processing systems. A typical system may include one or more large capacity tape units and/or disk drives (magnetic, optical, or semiconductor) connected to the systems through respective control units for storing data. High-speed, reliable data storage and file serving is a must for any large computing system. Virtualization, implemented in whole or in part as one or more RAIDs, is a preferred method of providing high-speed, reliable data storage and file serving.

A VDisk is usually represented to the host by the storage system as a logical unit number (LUN) or as a mass storage device. Typically, a VDisk is simply the logical combination of one or more RAIDs.

Because a VDisk emulates the behavior of a PDisk, virtualization can be done hierarchically. An example of this principle, VDisk mirroring is a critical component of virtualized storage systems. The concept is to create a separate RAID that is used to duplicate an existing RAID. As already described, mirroring allows data recovery and access via the mirrored system when a serious event disables the entire primary system, or even just the primary VDisk (or RAID) if all of the RAIDs are in the same system. In VDisk mirroring, the copies will have the same size but can otherwise have very different virtual configurations, such as different types of RAIDs. For example, a VDisk containing two 200 gigabyte (200G) RAID 5 arrays may be mirrored to a VDisk that contains one 400G RAID 10 array.

Solid state drives (SSDs), sometimes called solid state disks, are a major advance in storage system technology. An SSD is a data storage device that uses non-volatile memory such as flash, or volatile memory, such as SDRAM, to store data. The SSD can replace a conventional rotational media hard drive (RMD), which has spinning platters. There are a number of advantages of SSDs in comparison to traditional RMDs, including much faster read and write times, better mechanical reliability, much greater IO capacity, an extremely low latency, and zero seek time. A typical RMD may have an input/output (IO) capacity of 200 random IO operations per second, while a typical DRAM SSD may have an IO capacity of 20,000 random IOs per second. This speed improvement of nominally two orders of magnitude is offset, however, by a cost of SSD storage that, at today's prices, is roughly two orders of magnitude higher than RMD storage.

The invention encompasses any situation in which a device with a fast write speed, or input/output capacity for writes, is mirrored to a plurality of devices with lower write speeds. For example, a DRAM SSD is about 20% faster for reading than a Flash SSD, but may be 10 to 20 times faster for writing. Currently, the cost per gigabyte of DRAM SSD is roughly 16 times that of Flash SSD. Some embodiments of the invention include a DRAM SSD that is mirrored to a plurality of Flash SSDs, across which the data is striped. Even with technologies that do not exist today, the approach of the invention will allow discrepancies in write speeds between types of mirroring devices to be compensated for by striping across a plurality of slower devices.

SUMMARY OF THE INVENTION

A storage system employing only SSDs for mirroring would provide excellent read and write performance. This is true whether the mirroring is traditional RAID mirroring, or VDisk mirroring. But the cost of maintaining two or more copies of data, each copy on a separate SSD, would be high. Because of their high speed, striping across SSDs is rarely used.

Anything that can be done to reduce the cost per gigabyte of storage while improving the performance of a mirrored pair over an approach based solely on RMDs can have a dramatic effect on applications for which the storage system is the primary bottleneck for throughput or responsiveness.

The inventor has realized that a mirroring solution having much of the performance advantage of mirroring between two SSDs can be obtained by mirroring data between an SSD and a relatively large number of significantly slower RMDs, striping data from the SSD across the RMDs. Under normal circumstances, all read operations can be done by accessing the SSD. The same inventive concept applies more generally, whenever a device having a fast write speed is mirrored to a plurality of devices, across which the data is striped, having a slower write speed.

The large number of RMDs utilized in striping the mirror copy will allow substantial parallelization of write operations, in effect recovering much of the performance advantage that would be achieved by having two SSDs mirror each other. A synchronous write operation requires completion by all the RMDs involved in striping. In an exemplary system employing fifty RMDs, a write to the RMDs would complete in about twice the time the corresponding write would require on the SSD. Initial purchase of so many RMDs would itself be costly. On the other hand, the RMDs are legacy equipment that a company might have available already, which might be complemented by a new SSD to dramatically improve mirror performance. In some embodiments of the invention, the combined write speed of the slow-write storage devices (e.g., RMDs) is no less than 25% that of the fast-write storage device (e.g., SSD) for writing the mirror copy, while the fast-write storage device is at least 10 times as fast in write operations as an individual slow-write storage device.

The entire SSD might require mirroring, but it is also possible that a mirroring scheme might apply to just some portion of the SSD. The SSD itself might be subdivided into regions, such as partitions analogously to partitions on an RMD. Every SSD has some smallest addressable unit of storage, which we will refer to as a data storage cell. The data storage cell might be a single byte, or two or more bytes in length. It is easiest to conceptualize a "region" containing data to be mirrored as consisting of contiguous storage cells arranged sequentially. Because the hardware characteristics of an SSD are similar to computer memory, a "region" of data to be mirrored might consist of two or more discontinuous extents, possibly connected by pointers. Henceforth in this document, mirroring the SSD should be understood to mean mirroring all of the SSD or the portion of the SSD involved in the particular configuration. The region of the SSD being mirrored might itself contain a RAID, or any virtualized configuration of data.

The invention is not limited to embodiments including a single SSD. For example, two SSDs might mirror each other, with a third copy being provided by a mirroring set of RMDs. This configuration would allow one SSD to go offline without losing high-speed reads and without losing redundancy. In other embodiments, a single data object, dataset, or storage extent could be spread across portions of multiple SSDs; this object, dataset, or extent could be mirrored to, and striped across, a plurality of RMDs or RMD portions.

In some embodiments, there can be multiple mirror copies of data from an SSD maintained on RMDs. An SSD mirrored to two sets of RMDs provides more redundancy than mirroring to just one set, without appreciably sacrificing either read or write speed.

In some embodiments of the invention, a virtual or RAID configuration of data is maintained on one or more SSDs for IO operations. One or more mirrors of this virtual or RAID configuration are maintained on respective sets of rotational media drive.

In still more general embodiments of the invention, data, which might include a virtual or a RAID configuration of data, is maintained on one or more fast-write storage devices. One or more mirrors of this data are maintained on respective sets of slow-write storage devices, where the fast-write storage devices have higher IO capacities for writing than the slow-write storage devices, in some embodiments by a factor of 10, 100, or more. Striping of data across sufficiently many RMDs can result in 25%, 50%, or more of the write IO capacity of an SSD.

The storage system in some embodiments of the invention includes a controller. The controller receives requests for IO operations that involve the portion of the SSD being mirrored. The controller contains a management module and a storage module. The storage module interacts with the PDisks to read and write data thereon. The management module directs the storage module in determining the physical device, and locations thereon, to use for particular IO operations. The management module contains logic that determines whether the fast-write storage device, the slow-write storage devices, or both will be used to respond to a request. If the fast-write storage device is faster for reading than the slow-write storage device, as will typically be the case, the management module will direct the storage module to use the fast-write storage device to service read requests under normal operating conditions. Upon an event that results in the fast-write storage device becoming unavailable, the controller will direct read requests to the mirror copy on the slow-write storage devices, unless another mirror copy is being maintained on a faster device.

The controller, the management module, and the storage module are defined functionally, and not by the enclosure housing them. The controller might be contained in a single device, or distributed over several devices. The controller might reside in any storage system level. For example, it might be in a host or hosts; or in one or more physical storage devices; or in a separate network device. It might be spread over two or more of these levels. For example, the management module might be housed in a network device, and each physical storage device might contain a portion of an aggregate storage module.

The storage system may be connected to a digital communication system. The digital communication system may be a wide area network (WAN), a local area network (LAN), a personal area network (PAN), or some combination thereof. The network may be wired, wireless, or implemented in whole or in part by a hardware bus. In some embodiments, the digital communication system will incorporate Fibre Channel technology. The digital communication system provides access by one or more hosts to the storage system. The hosts may run application software, which might access databases or other data objects represented in storage that is included in the mirroring operation. Requests to the controller for IO operations commonly originate from such hosts.

The controller may provide an interface whereby contents of the storage system can be accessed as a VDisk. This VDisk might be so simple as to just represent the data being mirrored between the fast-write storage device and the slow-write storage devices. Also within the scope of the invention, however, the mirror might be a single element in a complex virtualization scheme, represented by the VDisk, that involves various RAIDs or RAID-like storage management techniques.

When the copy of data mirroring a portion of an SSD is being striped across a plurality of RMDs, some of the RMDs may be experiencing load from other processes using portions of the drive not involved in the mirroring relationship. Prioritization of the load on a particular drive based on various factors may cause the stripes in the mirror copy to be written in some time order different from the sequence in which the data is arranged on the fast-write storage device.

DETAILED DESCRIPTION OF THE INVENTION

Figure 1:
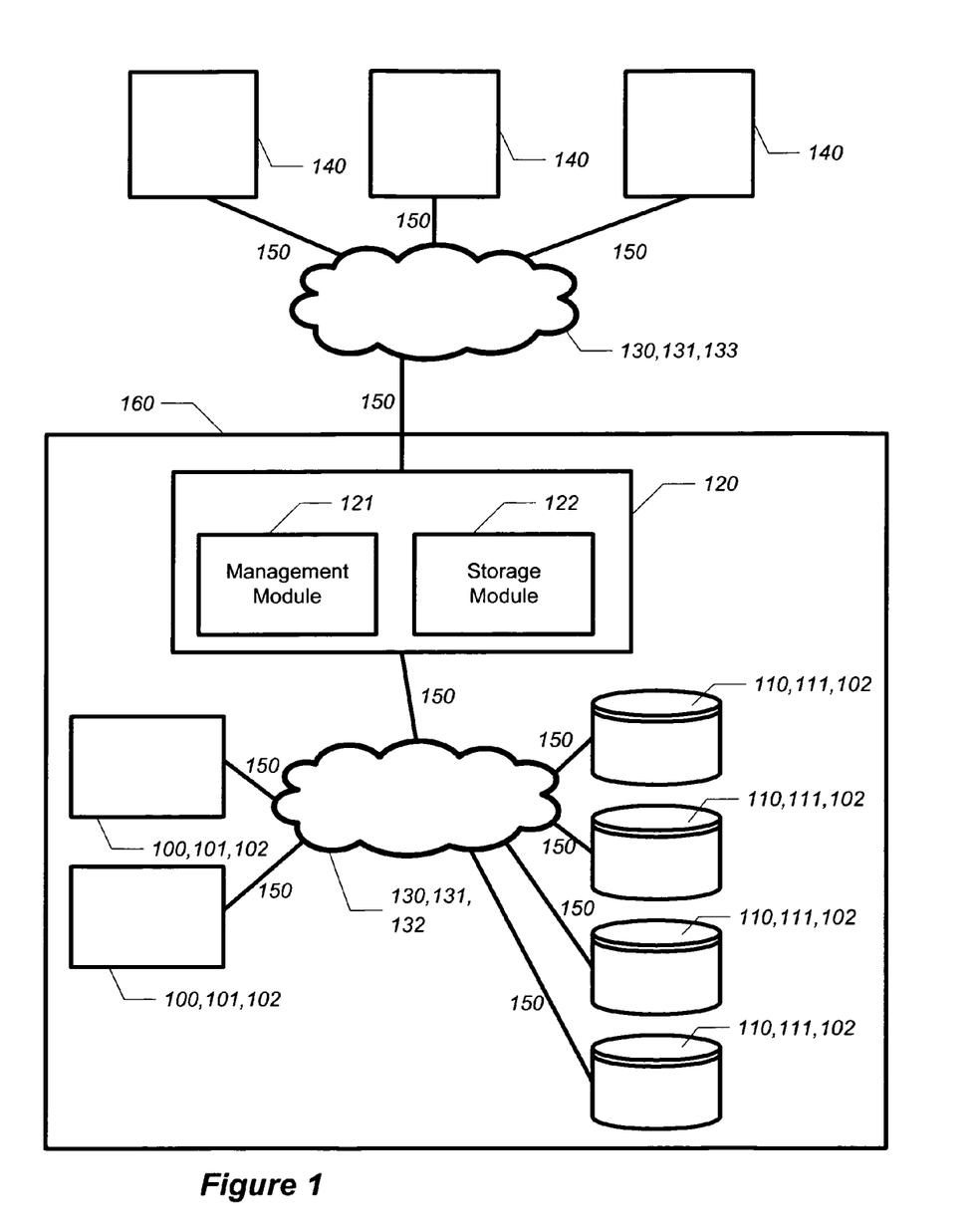
FIG. 1 is a block diagram illustrating a storage system according to an embodiment of the present invention, involving an SSD mirrored by a plurality of RMDs over which data is striped.

FIG. 1 illustrates a storage system 160 according to an embodiment of the present invention. The storage system 160 includes at least one digital fast-write storage device 101 and at least one digital slow-write storage device 111. The slow-write storage devices 111 mirror data from at least one of the fast-write storage devices 101. "Fast-write" and "slow-write" refer to the respective IO capacities for writing, or the write speed, of the devices. In some embodiments, the fast-write storage devices 101 also have significantly higher read speeds than the slow-write storage devices 111, but in other embodiments, their read speeds might be comparable. It is even possible, within the scope of the invention, that the slow-write storage devices 111 might be faster for reading, possibly substantially so, than the fast-write storage devices 101.

The data being mirrored is striped across the slow-write storage devices 111. In some embodiments of the invention, the fast-write storage devices 101 are solid state drives (SSDs) 100. In some embodiments, the slow-write storage devices 111 are rotational media disks (RMDs) 110.

The storage system 160 includes a controller 120 that carries out requests for operations that, for example, read data from, or write data to, the storage system 160. The controller 120 includes a management module 121 and a storage module 122. The storage module 122 accesses the storage devices 102 for IO operations. The management module 121 receives requests through a host communication system 133 to which the controller 120 is connected. Such requests typically originate from application hosts 140. The management module 121 controls how the storage module 122 fulfills the requests. The management module 121 may also monitor system operations, collect performance and operations statistics, and transmit diagnostics in response to various conditions or events, such as device failures. In some embodiments, the management module 121 also automatically reconfigures the storage system 160 as necessary under certain circumstances. For example, if a device containing mirrored data fails, the management module 121 may direct the storage module 122 to execute all IO operations using devices holding another copy. If the storage system 160 is virtualized, the management module 121 will respond to requests from hosts 140 for IO as if it were a single hard drive, while causing the storage system 160 to implement those operations necessary to implement the virtualization configuration, which might include operations such as mirroring and striping.

The management module 121 and the storage module 122 implement logic that executes instructions. The instructions may be stored in digital storage of any kind. Within the scope of the invention, however, the logic, and any instructions that embody the logic, may be implemented in hardware or software, or any combination thereof.

Communications among the controller 120 and the storage devices 102 are transmitted across a storage communication system 132. In general, a digital communication system 130 must be capable of transferring information in digital form. It can be wired or wireless. It can be a network 131, such as a wide area network (WAN), a local area network (LAN), a personal area network (PAN); or a hardware bus. It can be some combination of communications means or networks 131.

The storage system 160 will be used by one or more application hosts 140 for storage and retrieval of data. Preferably, configuration of data on the physical storage devices 102 will be handled by the controller 120, which will provide access to the hosts 140 through a virtualized configuration, which might include one or more levels of RAID. Virtualization presents a facade that hides from the hosts complexities such as allocation of data to physical drives, mirroring, and striping. Communications between the hosts 140 and the storage system 160 utilize a host communication system 133, which is another digital communication system 130 and, in some embodiments, a network 131. In some embodiments, actual transfer of data between a host 140 and a physical storage device may incorporate a Fibre Channel system. The host communication system 133 and the storage communication system 132 may be the same communication system 130 in some embodiments. The connections 150 of the various devices and systems to the communication systems 130 are all shown with a single reference number, but they can be of any types.

The basic concept of the invention is to mirror fast storage to slower storage, striping the mirrored data over a plurality of the slow-write storage devices 111. The idea is to use sufficiently many of the slow-write storage devices 111 that a write operation to the mirror copy on the slow-write storage devices 111 will complete in a time not significantly longer than a simultaneous write to the fast-write storage devices 101, thus compensating for the write speed differential. The number of slow-write storage devices 111 can be chosen to satisfy any specified degree of compensation. The data on the fast-write storage devices 101 can have any structure, and will ordinarily not be separated into noncontiguous stripes. However, there is no reason why, in theory, the data on the fast storage could not exist in noncontiguous stripes; embodiments of the invention encompass that situation as well as the normal one. In most embodiments, the mirroring is carried out by the controller 120. Under normal operations, whichever storage device 102 has the faster read speed will is used for read access. Generally, those commercial devices that are faster for write operations are also faster for read operations, but not necessarily. A write operation is not completed until all stripes have been written to the slow-write storage devices 111. Striping over a sufficiently many slow-write storage devices 111 can compensate to any desired degree for their reduced write speed. In the case of a failure of a fast-write storage device 101, the slower storage can be used for both read and write access to the data. Ordinarily, this arrangement will be temporary until fast-write storage device 101 can be repaired or replaced. Input and output operations will ordinarily be under control of the storage module 122. Determination of which device to use for a particular operation will ordinarily be done by the management module 121, which will instruct the storage module 122 to direct or redirect accesses appropriately.

Figure 2:
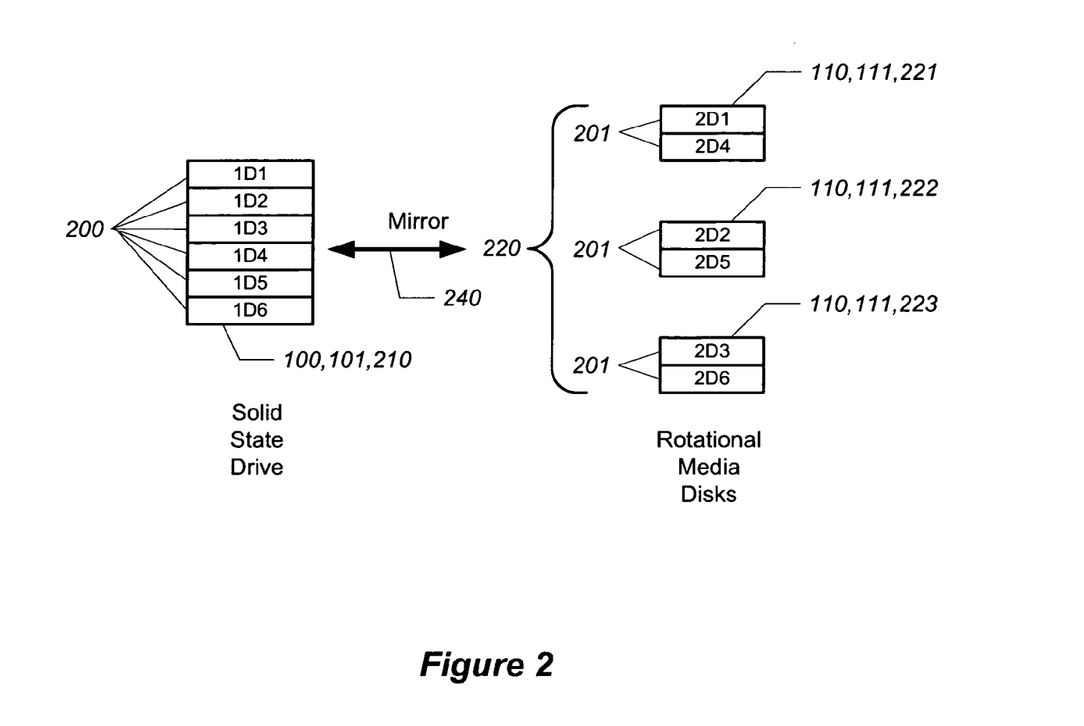
FIG. 2 is a block diagram illustrating mirroring according to an embodiment of the invention, involving an SSD mirrored to two differently configured RAID copies on RMDs, over which data is striped.
Figure 3:
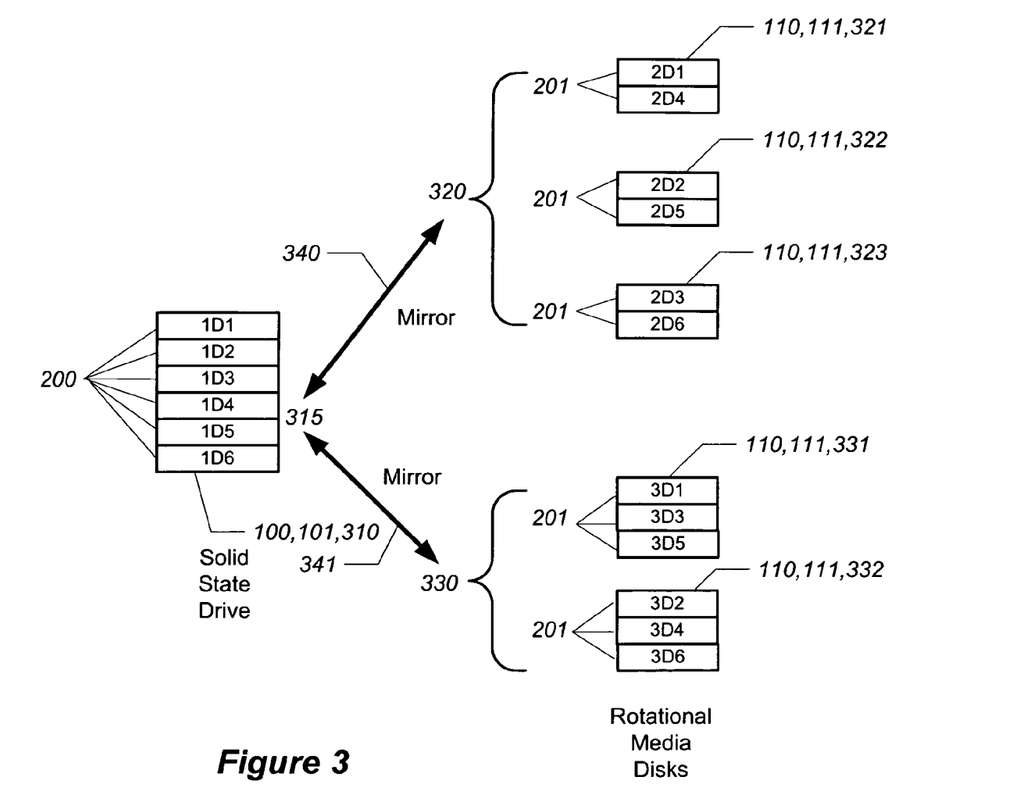
FIG. 3 is a block diagram illustrating mirroring according to an embodiment of the invention, in which an extent spanning two SSDs is mirrored to a plurality of RMDs over which data is striped.
Figure 4:
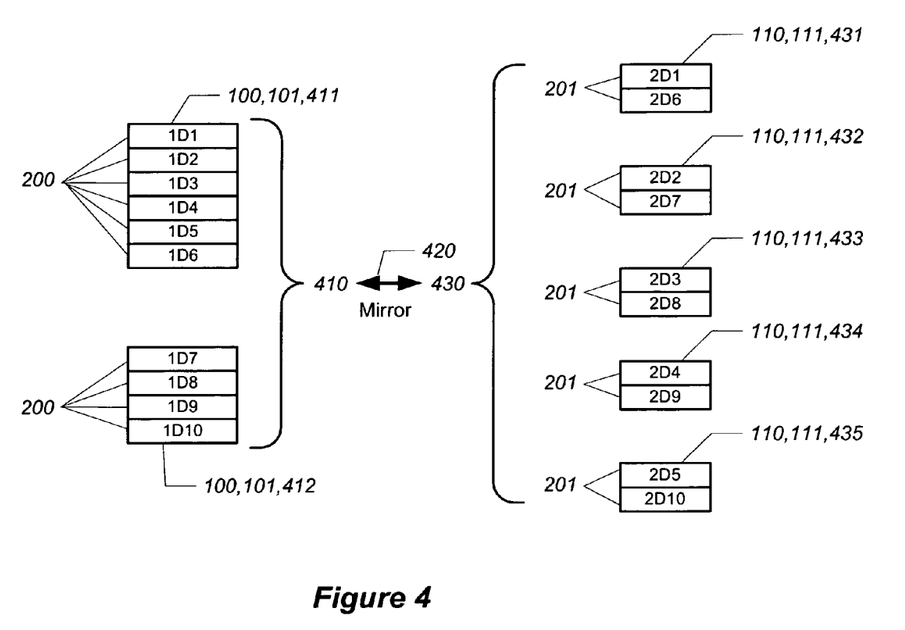
FIG. 4 is a block diagram illustrating mirroring according to an embodiment of the invention.

FIGS. 2 through 4 illustrate mirroring schemes in exemplary embodiments of the invention. Many configurations other than those shown in the figure are included within the concept of the invention, as already described herein.

In the exemplary embodiment of FIG. 2, data on a fast-write storage device 101, namely the SSD 100 labeled 210, is being mirrored to three slow-write storage devices 111, namely the RMDs 110 labeled 221, 222, and 223. In this example, as in others, the data involved in the mirror may occupy all the storage space on a given storage device 102. More generally, however, the data being mirrored may only take up a portion of any given storage device 102. This is particularly important with respect to write operations on slow-write storage devices 111, which may have load from other processes that can contend with the mirroring relationship.

The relevant data on the SSD 210 is logically divided into six subextents 200 that correspond to stripes 201. Of course, actual data might be divided into any number of stripes 201. Individual stripes 201 and corresponding subextents 200 will be labeled cDs, where c is the copy index number and s is the stripe 201 index number. (This convention is also used in FIGS. 3 and 4. For example, 2D4 refers to the fourth stripe of the second copy 220 of the data. The six stripes 201 in the second copy 220 are labeled 2D1 through 2D6. In the illustration, these are spread across the three RMDs 110, with stripes 2D1 and 2D4 on RMD 221, 2D2 and 2D5 on 222, and 2D3 and 2D6 on 223. The subextents 200 corresponding to the stripes 201 on the RMDs 110 in the first copy 215 of the data, located on the SSD 100, are labeled 1D1 through 1D6. The mirroring relationship is designated by an arrow 240. As described herein, under normal operations all reads will be done against the SSD 100 because it is faster for read operations than the RMDs 110. Writing the two copies of the data will only complete when the slowest device finishes writing its portion of the data. But the use of three RMDs 110 will substantially reduce the time to about one third the time in which a solitary RMD 110 can write the data. Obviously, more RMDs 110 would reduce the time further. Based upon typical current prices and relative IO capacities, a second copy striped to 50 RMDs 110 would take about twice as long to create as would writing a second copy to a second SSD 100. The cost of the RMD 110 hardware itself would be half that of a new SSD 100, but many companies have legacy RMDs 110 available that could be used for the task.

Note that the devices, whether fast-write storage devices 101 or slow-write storage devices 111, can be accessed in any order for reading or writing the stripes. That is, subextents that are logically consecutive on the fast-write storage device 101, which correspond to stripes, do not need to be written consecutively in time. Load on a device from other processes may dictate when logic on the controller 120 causes a particular stripe 201 to be written to that device.

Striping a copy of the data, especially across a large number of devices, introduces vulnerability because the loss of a single device renders the entire copy unreadable. Consequently, it often makes sense to have one source mirror copy and two or more target mirror copies. FIG. 3 illustrates this principle in another embodiment of the invention. In this case, there are three copies of the data, one (labeled 315) on an SSD 100 labeled 310, and two (labeled 320 and 330) on respective sets of RMDs 110. The mirroring relationships are indicated by arrows labeled 340 and 341. Note that the two sets of RMDs 110 have different RAID configurations. The first set 320 includes three drives (labeled 431, 432, and 433), each with two stripes 201. The second set 330 includes two drives (labeled 434 and 435), each with three stripes 201. This illustrates that, in general, the striping schemes across the respective sets of slow-write storage devices 111 may be different. The drives in set 320 might perhaps perform writes more slowly than those in set 330, motivating striping across more drives to compensate. In the examples of FIG. 2 and FIG. 3, one or more additional copies (not shown) could be made to other fast-write storage devices 101, such as SSDs 100.

FIG. 4 illustrates an embodiment of the invention in which data spread across a plurality of fast-write storage devices 101 is mirrored to a plurality of slow-write storage devices 111. In the exemplary case, there are two copies of the data, a first copy 410 and a second copy 430. The two copies are mirrors of each other, as indicated by an arrow 420. The first copy 410 is maintained on two SSDs 100, labeled 411 and 412. The second copy 430 includes the data in striped form spread across five RMDs 110, labeled consecutively from 431 to 435. Each RMD 110 contains two stripes 201 that reflect subextents 200 of the data on the SSDs 100. The illustrated mirroring scheme is an example of a class of embodiments in which there are at least two fast-write storage devices 101 mirrored to at least two slow-write storage devices 111. The number of stripes into which the data is divided must be at least two, but could be any larger number.

Figure 5:
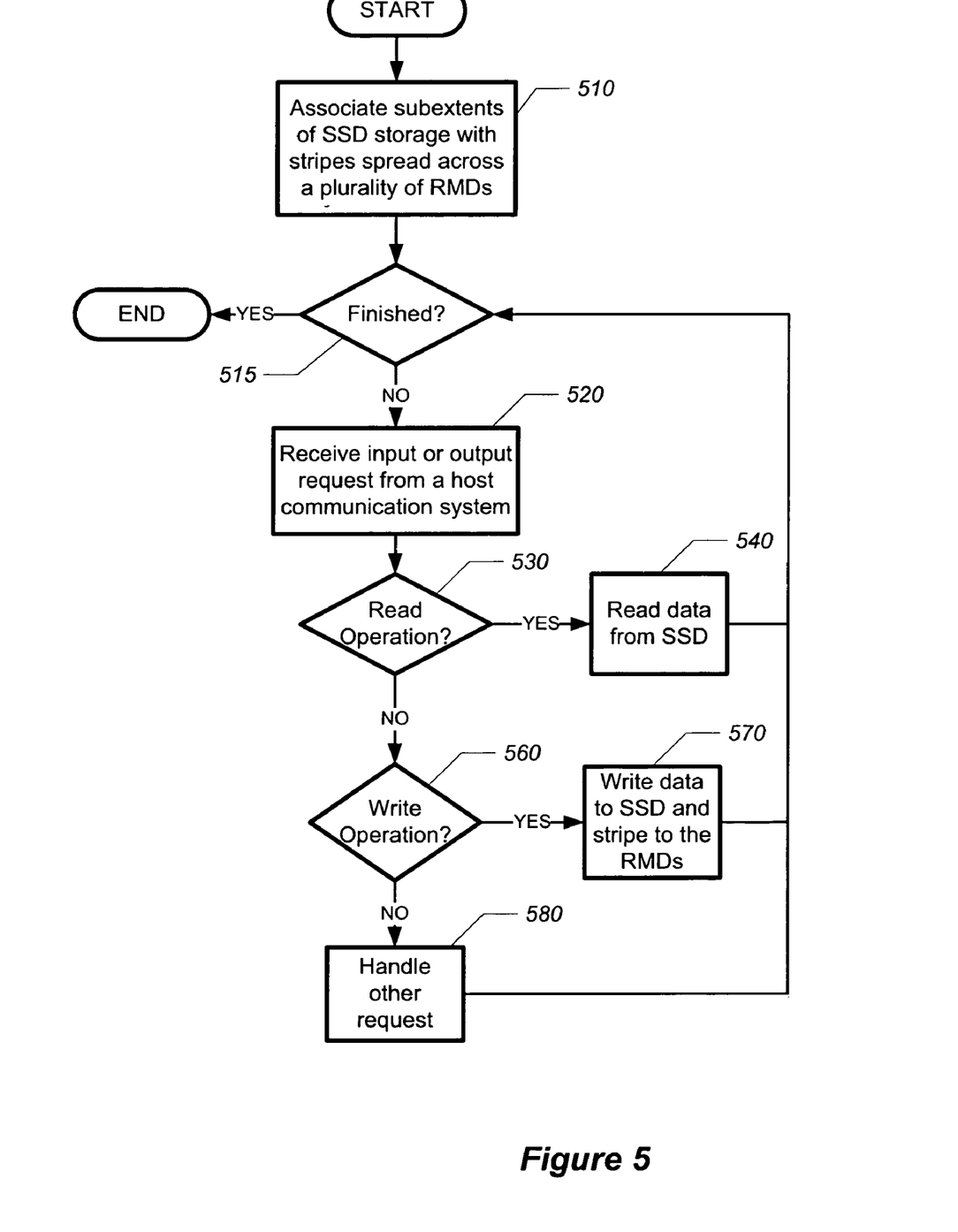
FIG. 5 is a flowchart illustrating the processing of read and write requests in an embodiment of the invention.

FIG. 5 is a flowchart illustrating how read and write requests, which are typically received from hosts 140 connected to a network 131, are handled in an embodiment of the invention under normal conditions. This embodiment assumes that the fast-write storage device 101 is also faster than the slow-write storage devices 111 for reading. The subextents 200 of data on one or more fast-write storage devices 101 are associated 510 in a mirroring relationship with stripes 201 spread across a plurality of slow-write storage devices 111. In the exemplary embodiment, the fast-write storage devices 101 are SSDs 100, and the slow-write storage devices 111 are RMDs 110. FIGS. 2 through 4 show some typical kinds of mirroring relationships that might be established by step 510. In some embodiments, a controller 120 maintains this association. At some point in the process, a check is made 515 to determine whether the process should end. For convenience, this step is shown at this point in the flowchart, but in other embodiments it could be elsewhere. An IO request is received 520 from a host communication system 133, typically transmitted by an application host 140, accessing portions of data storage involved in the mirroring relationship. Typically, this request will be received by the controller 120. The management module 121 will direct the storage module 122, which will actually perform any read or write access to the physical media, including the SSDs 100 and the RMDs 110. If 530 a read operation is to be performed, the data will be read 540 from the SSD 100. If 560 a write operation is to be performed, the data will be written 570 to both the SSD 100 and to the RMDs 110. Enough RMDs 110 will be used in the striping so that a write operation will complete on the set of RMDs 110 within some factor (typically, but not necessarily, greater or equal to 1) of the time it takes the SSD 100 to complete the write. If some other request is received, then it will be handled 580 appropriately. Different orderings of these steps are possible within the scope of the invention. For example, the test for a write operation might precede the test for a read operation. Some steps might be omitted (e.g., step 580), again within the scope of the invention.

Figure 6:
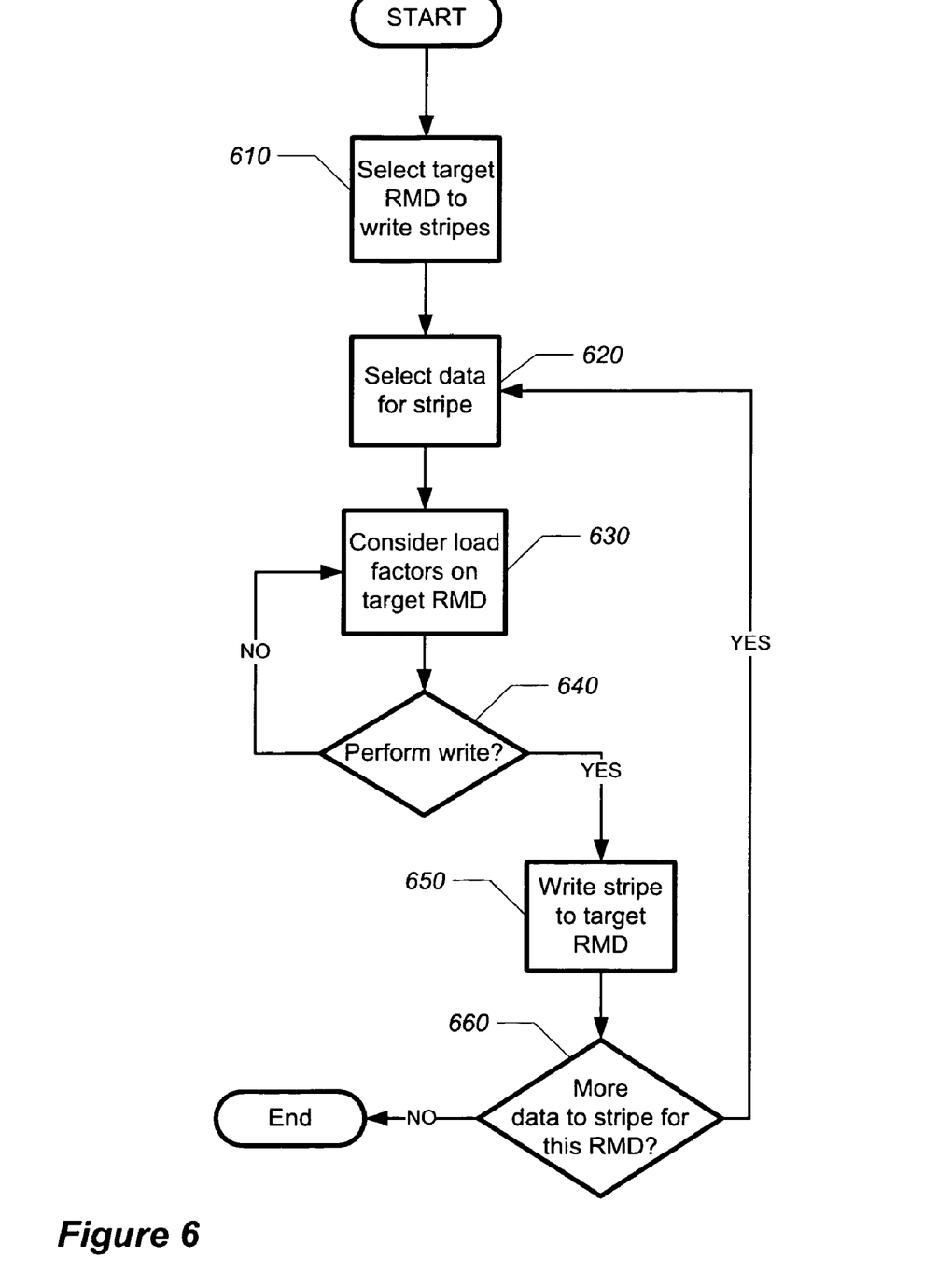
FIG. 6 is a flowchart illustrating how processes, other than the mirroring relationship to which the invention pertains, that access an RMD may affect the order in which stripes are written.

FIG. 6 is a flowchart of an exemplary embodiment of the invention, showing a reason why writing of stripes to the RMDs 110 might not occur in time order corresponding to their original sequence as stored on the SSD. As an introduction to this flowchart, consider the striping configuration of FIG. 2. If the three RMDs 110 in that figure had the same speed and were dedicated to the mirroring operation (i.e., no processes were using those disks for other purposes), then one might expect stripes 2D1, 2D2, and 2D3 to be written nearly simultaneously in parallel. Subsequent to completion of those operations, stripes 2D4, 2D5, and 2D6 would be written approximately in parallel.

But if one or more of the RMDs 110 in FIG. 2 were being used concurrently for other processes, a different ordering of writes might well occur. FIG. 6 is a flowchart that shows how load can be considered in choosing when to write particular stripes 201 to a slow-write storage device 111. Load can influence the timing of writes of individual stripes to the slow-write storage device 111. Because storage on an SSD 100 (and presumably on any fast-write storage device 101) is relatively expensive, a given mirroring relationship is likely to only involve a small fraction of the SSD 100. It follows that only a small fraction of any given RMD 110, which might have a large storage capacity, will typically be involved in the mirroring relationship. Other processes may be accessing the RMD 110 for other purposes. In the flowchart, a target RMD 110 upon which to write data in stripes 201 is selected 610. The stripes 201 correspond to subextents 200 of the SSD 100 that are assigned to that RMD 110 by a mirroring relationship, such as one of those illustrated by FIGS. 2 through 4. This selection will ordinarily be done by the controller 120. Typically, all the data will be assigned to stripes 201, to be divided among the RMDs 110 using striping schemes well-known to practitioners in the art. The flowchart pertains to any one of the RMDs 110. Data is selected 620 to be written as a particular stripe 201 to that target RMD 110. The data may be written to the RMD 110 directly, or it might be first written to an SSD 100 participating in the mirroring operation and then copied to the RMD 110. Load factors on the target RMD 110 are then considered 630 to determine whether to write the stripe 201 at this time. Factors relevant to determining load include: whether an IO operation is in process on the device; queued requests for use of the device; head thrashing; and priorities associated with, or assigned to, particular operations. Based on consideration of the load factors, a determination is made 640 whether to perform the write now. If so, then the stripe 201 is written 650 to the RMD 110. Otherwise, the process waits until the load factor check indicates that the write should be performed. If there is more data to write 660 to this drive, the process continues; otherwise it ends. FIG. 6 is exemplary of embodiments of this aspect of the present invention. Other embodiments may perform the steps in a different order. For example, the check of whether there is more data to stripe might be done at the start rather than at the end of the process.

Because the load balancing process illustrated by FIG. 6 may be done independently for plurality of RMDs 110 upon which stripes 201 are to be written, possibly for each stripe, the order in which stripes 201 are written to the RMDs 110 might not follow the same sequence in which the data appears upon the SSD 100. Two different RMDs 110 might have very different loads due to other processes competing for their resources. Of course, in the case of the embodiment described in FIG. 6, as throughout this description, one or more fast-write storage devices 101 of any type might replace the SSD 100, and slow-write storage devices 111 of any type might replace the RMDs 110. The resulting embodiment remains within scope of the invention.

It is worth repeating that the invention can be applied to any types of devices such that the write IO capacity of the fast-write storage device 101 is substantially greater than that of the slow-write storage devices 111. In some embodiments, the fast-write storage device 101 also has a faster read speed than the slow-write storage device 111. This is true for example where the fast-write storage device 101 is an SSD 100 and the slow-write storage devices 111 are conventional RMDs 110. In this case, read requests will ordinarily all be directed to the fast-write storage device 101. In other embodiments, the fast-write storage device 101 and the slow-write storage devices 111 might have comparable read speeds. For example, the fast-write storage device 101 might be a DRAM SSD 100 and the slow-write storage devices 111 might be Flash-based SSDs 100, or Flash SSD 100. A DRAM SSD 100 reads only about 20% faster than a Flash SSD 100, but might write 10 to 20 times as fast. Currently, the cost per gigabyte of DRAM SSD 100 is roughly 16 times that of Flash SSD 100. Given the price differential, it makes sense to use the approach of the invention in this case, striping a mirror copy over a plurality of Flash SSDs 100. Ordinarily, in this case, read requests would still go to the DRAM SSD 100.

Embodiments of the present invention in this description are illustrative, and do not limit the scope of the invention. It will be apparent other embodiments may have various changes and modifications without departing from the scope and concept of the invention. The invention is intended to encompass the following claims and their equivalents.

What is claimed is:

1. A storage system, comprising:
   a) a digital fast-write storage device containing a first storage extent;
   b) a plurality of slow-write storage devices, wherein the write speed of the fast-write storage device is at least twice that of the individual slow-write storage devices; and
   c) a controller, adapted to execute logic, represented in hardware or software or some combination thereof, the logic adapted to
      (i) receive requests to read data from, or write data to, the storage system,
      (ii) maintain a mirror relationship with the first storage extent, whereby the copy is striped across the slow-write storage devices,
      (iii) causes read requests that could be satisfied by reading from either the first storage extent or from the mirror copy to be satisfied by reading exclusively from the first storage extent.

2. The storage system of claim 1, wherein the write speed of the fast-write storage device is at least 10 times that of each of the slow-write storage devices.

3. The storage system of claim 2, wherein a sufficient number of digital slow-write storage devices are employed in maintaining the mirroring relationship such that the combined write speed of the slow-write storage devices is no less than 25% that of the fast-write storage device.

4. The storage system of claim 1, wherein the storage system responds to read and write requests for data contained in a virtual disk that is implemented by the mirroring relationship.

5. The storage system of claim 1, further comprising:
   d) a digital communication system to which the storage system is connected, and from which the storage system is adapted to receive requests to read or write data.

6. The storage system of claim 5, wherein the digital communication system includes Fibre Channel technology.

7. The storage system of claim 1, wherein the controller includes
   (i) a storage module adapted to execute instructions to read data from, and to write to, at least one of the digital fast-write storage device or the digital slow-write storage devices, and
   (ii) a management module adapted to select which of the digital storage devices the storage module will use to fulfill a request to read data from, or write data to, the storage system.

8. The storage system of claim 1, wherein the digital fast-write storage device is a solid state drive.

9. The storage system of claim 1, wherein at least one of the digital slow-write storage devices is a rotational media drive.

10. The storage system of claim 1, wherein at least one of the digital slow-write storage devices is a solid state drive.

11. A method of maintaining a mirroring relationship, comprising:
    a) maintaining a first storage extent on a digital fast-write storage device; and
    b) maintaining a mirror copy of the contents of the first storage extent in a striped configuration, whereby the copy is maintained in stripes across a plurality of digital slow-write storage devices, the write speed of the fast-write storage device for writing being at least twice that of the individual slow-write storage devices, and wherein a plurality of the stripes correspond to subextents of the first storage extent, the subextents having a sequential order in the first extent.

12. The method of claim 11, wherein the input/output capacity for writing of the fast-write storage device is at least 10 times that the individual slow-write storage devices.

13. The method of claim 2, wherein a sufficient number of digital slow-write storage devices are striped in maintaining the mirror relationship such that the combined write speed of the slow-write storage devices is no less than 25% that of the fast-write storage device.

14. The method of claim 11, further comprising:
    c) considering load upon the slow-write storage devices from processes other than maintaining the mirror copy; and
    d) based upon consideration of load, facilitating the writing of stripes to the slow-write storage devices in a time order that differs from the sequential order of subextents within the first storage extent.

15. The method of claim 11, further comprising:
    c) applying logic, implemented in hardware or software or some combination thereof, that, under normal operations, causes read requests to be responded to by reading exclusively from the first storage extent.

16. The method of claim 11, wherein the mirroring relationship implements a virtual disk.

17. The method of claim 11, wherein a controller includes logic that determines whether the fast-write storage device, the slow-write storage devices, or both will be used to respond to particular requests for input/output operations received by a storage system that includes the controller, the fast-write storage device, and the slow-write storage devices.

18. The method of claim 17, wherein the storage system is included in a storage area network, whereby requests for input or output operations are received by the storage system from a plurality of hosts through a digital communication system.

19. The method of claim 17, wherein the controller includes a storage module that executes input or output instructions utilizing physical storage devices, including the fast-write storage device and the slow-write storage devices, and a management module that determines which physical storage device that the storage module will use to execute a particular instruction.

20. The method of claim 11, wherein the fast-write storage device is a solid state drive.

21. The method of claim 11, wherein at least one of the plurality of slow-write storage devices is a rotational media drive.

22. The method of claim 11, wherein at least one of the plurality of slow-write storage devices is a solid state drive.

23. A method, comprising:
   a) receiving a request to write data to a virtual disk that includes a mirror configuration, whereby a first copy of data is maintained on a digital fast-write storage device in a first order in which sequential data is stored in consecutive storage units, and a second copy of the data is maintained on a plurality of digital slow-write storage devices in a second order that is striped across the plurality of digital slow-write storage devices;
   b) determining a portion of the data that will be written to a selected digital slow-write storage device from the plurality of digital slow-write storage devices according to the mirror configuration;
   c) selecting a subset of the portion of the data that will be stored as a stripe on the selected digital slow-write storage device;
   d) after delaying in response to load factors on the selected digital slow-write storage device from processes other than fulfillment of the request to write data, writing the subset to the stripe on the selected digital slow-write storage device; and
   e) repeating steps b through e until the portion of data has been completely written to the selected digital slow-write storage device.

24. The method of claim 23, wherein the digital fast-write storage device is a solid state drive.

25. The method of claim 23, wherein at least one of the digital slow-write storage devices is a rotational media drive.

26. The method of claim 23, wherein at least one of the digital slow-write storage devices is a solid state drive.

* * * * *